United States Patent
Groat et al.

(10) Patent No.: US 9,413,186 B2
(45) Date of Patent: Aug. 9, 2016

(54) DYNAMIC BOOST BATTERY CHARGERS

(71) Applicant: STORED ENERGY SYSTEMS, A LIMITED LIABILITY COMPANY, Longmont, CO (US)

(72) Inventors: Timothy C. Groat, Berthoud, CO (US); Herbert R. Kaewert, Atherton, CA (US)

(73) Assignee: Stored Energy Systems, a Limited Liability Company, Longmont, CO (US)

( * ) Notice: Subject to any disclaimer, the term of this patent is extended or adjusted under 35 U.S.C. 154(b) by 0 days.

(21) Appl. No.: 14/955,746

(22) Filed: Dec. 1, 2015

(65) Prior Publication Data

US 2016/0087466 A1 Mar. 24, 2016

Related U.S. Application Data

(62) Division of application No. 14/276,906, filed on May 13, 2014, now Pat. No. 9,270,140.

(60) Provisional application No. 61/823,335, filed on May 14, 2013.

(51) Int. Cl.
*H02J 7/00* (2006.01)
*H02J 7/04* (2006.01)
*H01M 10/44* (2006.01)

(52) U.S. Cl.
CPC ............ *H02J 7/007* (2013.01); *H02J 7/0004* (2013.01); *H02J 7/0052* (2013.01); *H02J 7/045* (2013.01); *H01M 10/44* (2013.01); *H02J 7/0036* (2013.01); *H02J 7/0042* (2013.01); *H02J 7/0045* (2013.01)

(58) Field of Classification Search
USPC ......... 320/107, 108, 109, 101, 162, 128, 149, 320/157, 160, 163
See application file for complete search history.

(56) References Cited

U.S. PATENT DOCUMENTS

| | | | | |
|---|---|---|---|---|
| 2011/0006737 A1* | 1/2011 | Saligram | ............... | H02J 7/0078 320/134 |
| 2011/0074357 A1* | 3/2011 | Parakulam | .......... | H01M 8/0432 320/134 |
| 2011/0084650 A1* | 4/2011 | Kaiser | ....................... | H02J 4/00 320/107 |
| 2012/0166697 A1* | 6/2012 | Hu | ........................ | H02J 7/0042 710/300 |
| 2013/0002190 A1* | 1/2013 | Ogura | .................... | H01M 10/44 320/101 |
| 2013/0234675 A1* | 9/2013 | King | ....................... | H02J 7/022 320/163 |
| 2013/0300347 A1* | 11/2013 | Xu | ......................... | H02J 7/0052 320/107 |

* cited by examiner

*Primary Examiner* — Alexis A Boateng
(74) *Attorney, Agent, or Firm* — James A. Sheridan; Sheridan Law, LLC

(57) ABSTRACT

There is disclosed a dynamic boost charging system having a monitoring component configured to measure total DC current and/or battery current and a reporting component configured to transmit output data of the total DC current and/or battery current measured. A battery charger control system in operable connection with the monitoring component receives the data of the total DC current and/or battery current measured by the monitoring component, and is configured to: obtain an initial time and/or charge measurement; determine a time and/or charge to complete a recharge cycle based on the time and/or charge measurement; selectively use at least two preset DC output voltage settings, one of the at least two preset DC voltage settings being a float voltage, and another of the at least two preset DC voltage settings being a boost voltage; and maintain the boost voltage until the time has passed the charge has been provided.

4 Claims, 8 Drawing Sheets

US 9,413,186 B2

DYNAMIC BOOST BATTERY CHARGERS

REFERENCE TO PENDING PRIOR PATENT APPLICATION

This application is a division of pending prior U.S. patent application Ser. No. 14/276,906, filed May 13, 2014, by Timothy C. Groat for DYNAMIC BOOST BATTERY CHARGERS, which claims the benefit under 35 U.S.C. 119 (e) of U.S. Provisional Patent Application No. 61/823,335, filed May 14, 2013 by TIMOTHY C. GROAT and HERBERT R. KAEWERT for "DYNAMIC BOOST BATTERY CHARGERS," which patent application is hereby incorporated herein by reference.

BACKGROUND

Generally, modern automatic battery chargers employ one of a number of charging methods, such as demand-based automatic boost charging, time-limited demand-based automatic boost charging, fixed extension demand-based automatic boost charging, or the like.

Limitations of standard demand-based boost charging systems and methods include that initiation and reversion thresholds must exceed the DC load on the battery plus the fully charged battery's current at boost charging voltage. Another limitation is that the initiation and reversion thresholds must allow for battery current variations caused by battery manufacturing differences, temperature, and aging. Because the method is not adaptive, another limitation of standard systems is that thresholds must be selected to avoid over-charging for the severe cases. This results in under-charging in most applications.

Limitations of time-limited demand-based boost charging systems and methods include the same general limitations as the standard demand-based boost charging method. The time-limited systems adds a backup means of boost charge termination, limiting the impact of over-charging if the initiation and reversion thresholds are too optimistic for the application. Another limitation is the time limit is not adaptive. It is set to a time that is ideal for only one specific recharge case and non-optimal for all others.

Limitations of fixed-time-extension demand-based boost charging systems and methods have the same general limitations as the standard demand-based boost charging method. It adds a fixed time extension to the boost charge, for the purpose of achieving a more complete charge for conservative reversion transition current settings. The limitation is that time extension is not adaptive. The time extension is the same regardless of battery condition, depth of battery discharge, temperature, etc. The selected value is a compromise between over-charging in some cases and under-charging in others. For example, some existing battery charges have a fixed six-hour extension to a demand-based boost charge. Since this time extension is fixed the battery will be over charged when it is lightly discharged and requires a shorter boost charge, or it will be under-charged when it is deeply discharged and requires a longer boost charge.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a dynamic boost charging method, comprising selectively producing a charging current from at least two preset DC voltage settings with a battery charger control system, one of the preset DC voltage settings being a float voltage, and another of the preset DC voltage settings being a boost voltage; and measuring the DC output current produced by the battery charger control system with an internal monitoring component in operable connection with the battery charger control system and configured to transmit output data of the DC output current measured by the internal monitoring component to the battery charger control system. Therein, an initial time or charge measurement is obtained, a determination is made as to an appropriate time or charge to complete the recharge cycle, based on that measurement, and boost voltage is maintained for or until the time has passed or the charge has been provided.

In accordance with embodiments of the present systems and methods for dynamic demand based boost charging, a dynamic charge counter may be initialized and a boost voltage set, if a float charge current is greater than an initiation threshold. During a boost charge a determination may be made as to whether a boost current is greater than an initiation threshold and a determination may be made whether a dynamic charge count limit has been reached, if the boost current is not greater than the initiation threshold. A predetermined percent over charge time may be added to the dynamic charge counter and the boost voltage retained, if the dynamic charge count limit has not been reached. A determination may be made as to whether the dynamic charge counter has reached zero, and the boost voltage may be retained if the dynamic charge count has not reached zero and the dynamic charge counter may be decremented. If a boost charge current is less than a reversion threshold, a determination may be made as to whether a dynamic charging is enabled. A float voltage may be set if the dynamic charge is not enabled. If the dynamic charge is enabled a determination may be made as to whether the dynamic charge count has reached zero. A float voltage may be set if the dynamic charge counter reaches zero. Additionally, a boost voltage may be terminated if the boost charge current is greater than a reversion threshold for greater than a predetermined time limit. The forgoing methods may be implemented automatically by a processor controlled battery charger Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Overview

Figure 1:
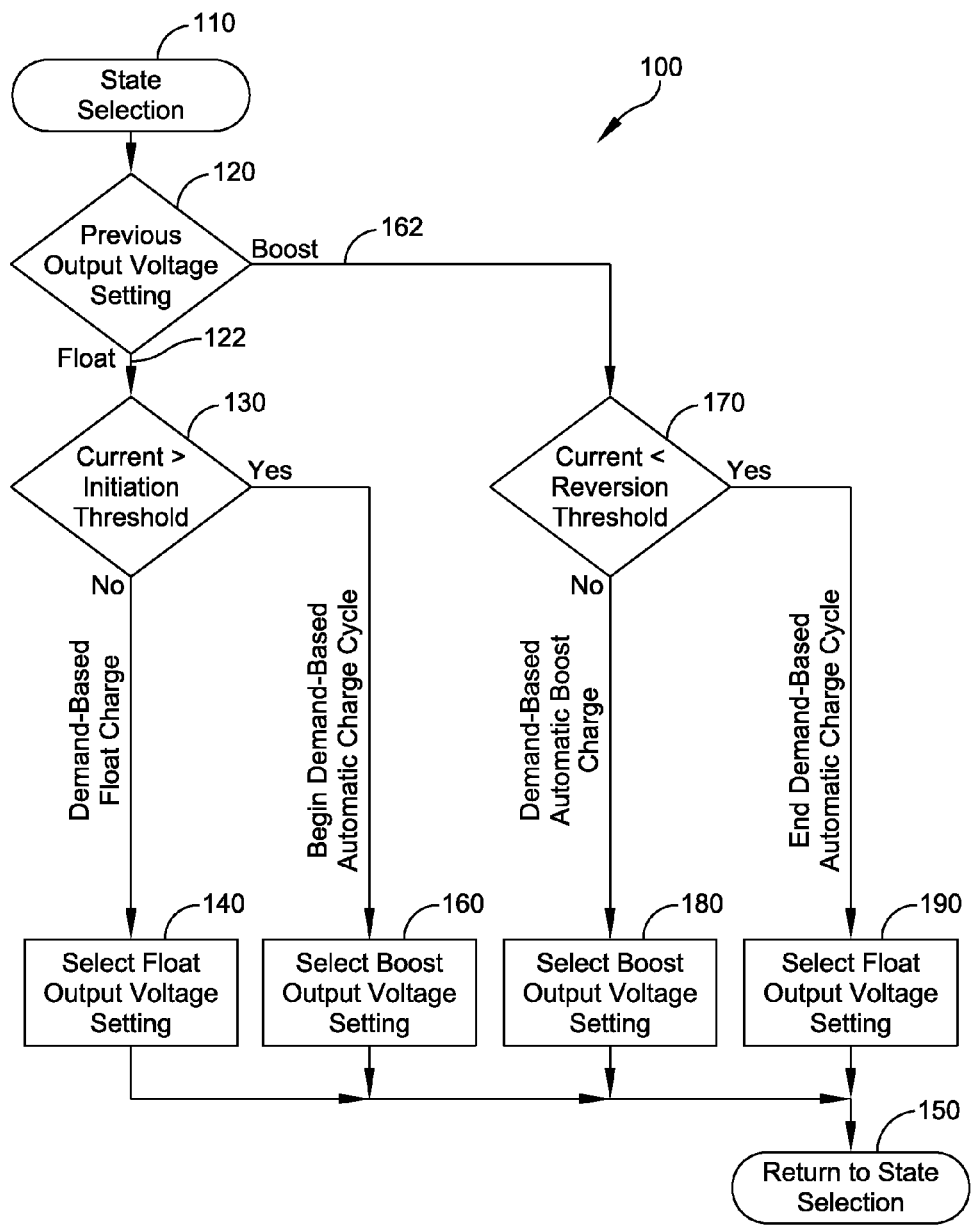
FIG. 1 (PRIOR ART) illustrates a flowchart diagram of a standard demand-based automatic boost charge for an auto-charge system and method.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

In various embodiments, dynamic boost charging systems and methods may provide more sophisticated and adaptive battery charging as compared to conventional battery chargers and charging system and methods. In various embodiments, a battery charging method may be referred to as a "dynamic boost" or "dynamic equalize" and may be used in a regulated battery charger. The present battery charging method recharges a discharged, or partially discharged, battery in an efficient manner as completely and quickly as possible, and without overcharging the battery. In various embodiments, the battery charging method may adapt to changing conditions of the battery and its environment.

Embodiments of the dynamic battery charging systems and methods described herein may be referred to in several different ways, including, but not limited to "dynamic boost," "dynamic equalize," "dynamic auto boost," "dynamic auto equalize," "dynamic demand-based auto boost," "dynamic demand-based auto equalize," and/or the like.

One of skill in the art will appreciate there is a subtle difference in the typical usage of the terms "boost" and "equalize". For engine starting applications, motive power and similar applications where the charger's primary function is recharge of a battery and not powering of a continuous DC load, the term "boost" is typically used to be descriptive of a rapid recharge after the battery is discharged by a discharge event. In applications where the charger delivers continuous DC power, such as industrial controls, switchgear, inverter or telecommunications applications, the term "equalize" is typically used to be descriptive of a higher charging voltage (the equalize voltage), which will cause individual cell voltages to become more nearly equal to each other by delivering a limited overcharge to the entire string of cells. In accordance with various embodiments, a battery charger can be placed into equalize mode manually, or programmed to perform automatic equalize on a periodic basis, for example monthly.

As used herein, the terms "charger" and "battery charger" are intended to be descriptive of a product that has electrical or mechanical input, output, and user controls. Inputs may include sinusoidal AC input power, DC power or mechanical energy, and provide regulated DC output current.

As used herein, the terms "microprocessor" and "microcontroller" are intended to be as general as possible and refer to an electronic component that has digital (and usually also analog) inputs and outputs. A microcontroller can be implemented using one or more electronic devices connected together and interconnected with other control circuitry inside of a battery charger, in accordance with embodiments of the present systems and methods.

As used herein, the terms "timer" and "counter" are intended to be as general as possible. In accordance with embodiments of the present systems and methods, a battery charger's timing functions can be implemented in a microcontroller, thus avoiding use of a separate piece of hardware that is a timer or that functions only as a timer. However, in other embodiments, the present dynamic demand-based boost charging systems and methods may be implemented using other timers such as mechanical counters, clockwork timers, and combinations of such devices.

A typical storage battery can be thought of as an ideal battery in series with electrical resistance. Maximizing the potential (voltage) difference between a charging source and battery, maximizes the rate at which current flows from the charging source into the battery. This high charging voltage mode is called "boost" charge mode. As the battery becomes charged the ideal battery accepts decreasing amounts of current. As current diminishes less voltage is lost to heat in the battery's internal resistance, exposing the ideal battery to increasing voltage from the constant voltage charging source. If not corrected, this excess voltage would overcharge and damage the battery. This problem is addressed by switching the charger's output voltage to a lower level in a charging mode called "float". The "float" mode allows the battery to accept just enough current to offset its self-discharge rate so as to maintain the battery at full charge.

A float voltage is set at a level that is appropriate for maintaining a fully charged battery. A typical value for float voltage is approximately 2.2 volts per cell, or 13.2 volts for a "12 Volt" (6 cell) "flooded" or "wet" lead-acid storage battery at a temperature of 25 degrees C. During normal float operation of a charger and battery, the current drawn by the battery (the "float current") should be low (typically less than 0.0025 amperes per ampere-hour battery capacity) if the battery is at or near a fully charged state.

The boost voltage is set at one or more different levels higher than the float voltage with the objective of recharging a discharged (or partially discharged) battery faster than the battery would be charged at the float voltage. Furthermore, the boost voltage is set at a level below a damaging voltage that may charge the battery too rapidly. A typical value for boost voltage may be approximately 2.4 volts per cell, or 14.4 volts for a "12 Volt" (6 cell) flooded lead-acid storage battery, at a temperature of 25 degrees C.

Depending on its state of charge, a battery will accept more or less current from a battery charger that is producing a regulated preset DC output voltage. Therefore, for a battery charger that is operating at float voltage, a battery will typically draw more current when it is in a discharged state as compared with the "float current" that it will draw when it is fully charged. Likewise, for a battery charger that is operating at boost voltage, a battery will typically draw more current when it is in a discharged state as compared with the current that it will draw when it is fully charged. Furthermore, for any given state of charge, a battery will typically draw more current when the battery charger is at boost voltage as compared with the current draw at float voltage.

Herein, descriptions of charging methods are presented within the context of a storage battery at a constant temperature of approximately 25 degrees C., and therefore will not consider the effects of increasing or decreasing battery (or necessarily ambient) temperature. Various charger embodiments that employ the present systems and methods for dynamic demand-based charging may also employ automatic temperature compensation. For temperatures that are more than 5 degrees C. higher or lower than 25 degrees C., automatic temperature compensation may be used that causes the battery charger's output voltage to be incrementally higher at lower ambient temperatures, and incrementally lower at higher ambient temperatures. The purpose of temperature compensation is to prevent undercharging and overcharging of the battery.

Embodiments of the present dynamic boost charging systems and methods recharge a battery both faster and more safely than a standard boost charging method. Standard demand-based automatic boost charging methods are commonplace in the industry. These charging methods use simple rules for making transitions between float and boost, in both directions, and they are not adaptive.

Prior art FIG. 1 illustrates a flowchart diagram of standard demand-based automatic boost charge for an auto-charge system and method 100. Beginning at state selection 110, a determination is made at 120 of a previous output voltage setting for the charger. If the charger was outputting a float voltage (122), then at 130 a determination is made as to whether the current being drawn by the battery from the charger is greater than an initiation threshold. If not, the demand-based float charge continues and the float output voltage setting is set or retained at 140 and the process returns at 150 to state selection at 110.

If at 130 a determination is made that the current being drawn by the battery from the charger is greater than an initiation threshold, a demand-based automatic charge cycle begins and a boost output voltage setting is selected at 160. The process then returns at 150 to state selection at 110.

However, if at 120 it is determined that the previous output voltage setting is at a boost voltage (162), then a determination is made at 170 whether a current reversion threshold has been reached. If it has not, a demand based automatic charge cycle is initiated, and a boost output voltage setting is selected/retained at 180. The process then returns at 150 to state selection at 110. If a determination is made at 170 that a current reversion threshold has been reached, the demand based automatic charge cycle ends and a float output voltage is set at 190. The process then returns at 150 to state selection at 110.

The initiation threshold may be equal to the current limit, or the reversion threshold may be equal to the initiation threshold. A straightforward implementation of the present systems and methods may employ identical current levels for all three settings, initiation threshold, current limit and reversion threshold.

As illustrated in prior art FIG. 1, standard boost charging method, may include a discharge and recharge cycle, based on an automatic "demand based" charging method 100. Hence, at some point, the battery is fully charged and drawing float current from the battery charger (122), which is operating at its float voltage setting. An event occurs (such as starting an engine with an electric starter motor powered by the battery, or powering a continuous DC load) so that the battery is now partially or completely discharged. The battery charger's output current automatically increases, due to the battery's increased charge acceptance (130). A demand-based recharge cycle begins (160). During the first part of the demand-based charge cycle, the battery charger operates at its maximum level (e.g., current limit). While the battery charger is operating at its maximum level, the battery voltage will typically remain at a level below the preset charge voltage levels (170). The battery charger's output setting automatically transitions from float voltage to boost voltage because its "demand based" charging method is designed to perform this voltage transition based on the demand for DC output current (180). As the battery is being recharged, its voltage will gradually increase toward the preset boost setting. Thereafter as the battery is further recharged, the battery charger is governed by the boost voltage limiting system, rather than the current limiting system. Output current will gradually decrease from its maximum level until it reaches a point called the reversion threshold (e.g., 10% of rated output current)(170), at which the battery charger automatically and immediately reverts from boost voltage to float voltage (190).

Figure 2:
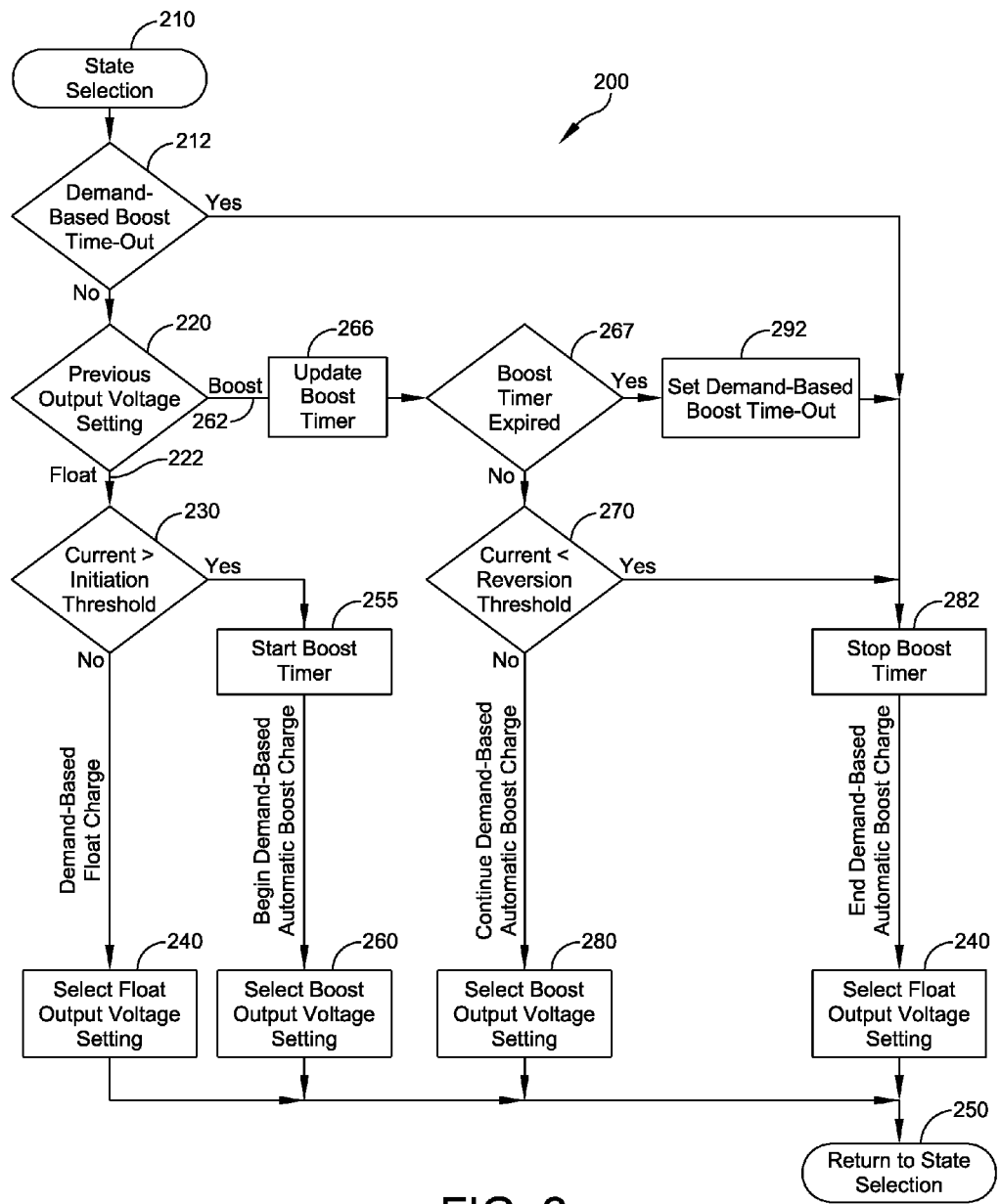
FIG. 2 (PRIOR ART) illustrates a flowchart diagram of a time-limited demand-based automatic boost charge for an auto-charge system and method.

Some existing automatic battery chargers include a time limit for the demand-based charge cycle. Prior art FIG. 2 illustrates a flowchart diagram of time-limited demand-based automatic boost charge for an auto-charge system and method 200. Therein, if the current remains above the reversion threshold until the time limit expires, the demand-based charge cycle will terminate. This provides a back-up means that terminates the recharge cycle if the current remains at a high level for an prolonged time, decreasing the risk of overcharging the battery (e.g., if an unanticipated load exceeds the charge termination current).

Hence, time-limited demand-based automatic boost charge for an auto-charge system and method 200 begins with state selection 210. At 212 a determination is made as to whether a demand-based boot timer has timed-out. If it has not, a determination of the previous output voltage setting is made at 220. If the charger is at the float voltage (222), then a determination is made at 230 whether the current being drawn by the battery from the charger is greater than a initiation threshold. If not, the demand-based float charge continues and at 240 the float output voltage setting is set or retained and the process returns at 250 to state selection at 210.

If at 230 a determination is made that the current being drawn by the battery from the charger is greater than an initiation threshold, a boot timer starts at 255, a demand-based automatic charge cycle begins, and a boost output voltage setting is selected at 260. The process then returns at 250 to state selection at 210.

If at 212 a determination is made that the demand-based boot timer has not timed-out, but a determination is then made at 220 that the previous output voltage setting for the charger is a boost voltage (262), then at 266 the boost timer reading is updated, and a determination is made at 267 whether the boost timer has expired. If the boost timer has not expired at 267, a determination is made at 270 as to whether a current reversion threshold has been reached. If a determination is made at 270 that a current reversion threshold has not been reached, a demand based automatic charge cycle is initiated or retained, by selecting or retaining the boost output voltage setting at 280, and the process returns at 250 to state selection 210.

However, if the current reversion threshold has been reached at 270, the boost timer is stopped at 282, and the demand based automatic charge cycle ends with a float output voltage being set at 290. The process then returns at 250 to state selection at 210.

If at 267, the boost timer has expired, a demand-based boost time-out is set at 292, the boost tinier is stopped at 282, a float output voltage is set at 290, and the process returns at 250 to state selection at 210.

Conversely, if a determination is made at 212 that the demand-based boost has timed out, the boost timer is stopped at 282, and the demand based automatic charge cycle ends with a float output voltage being set at 290. The process then returns at 250 to state selection at 210.

Figure 3:
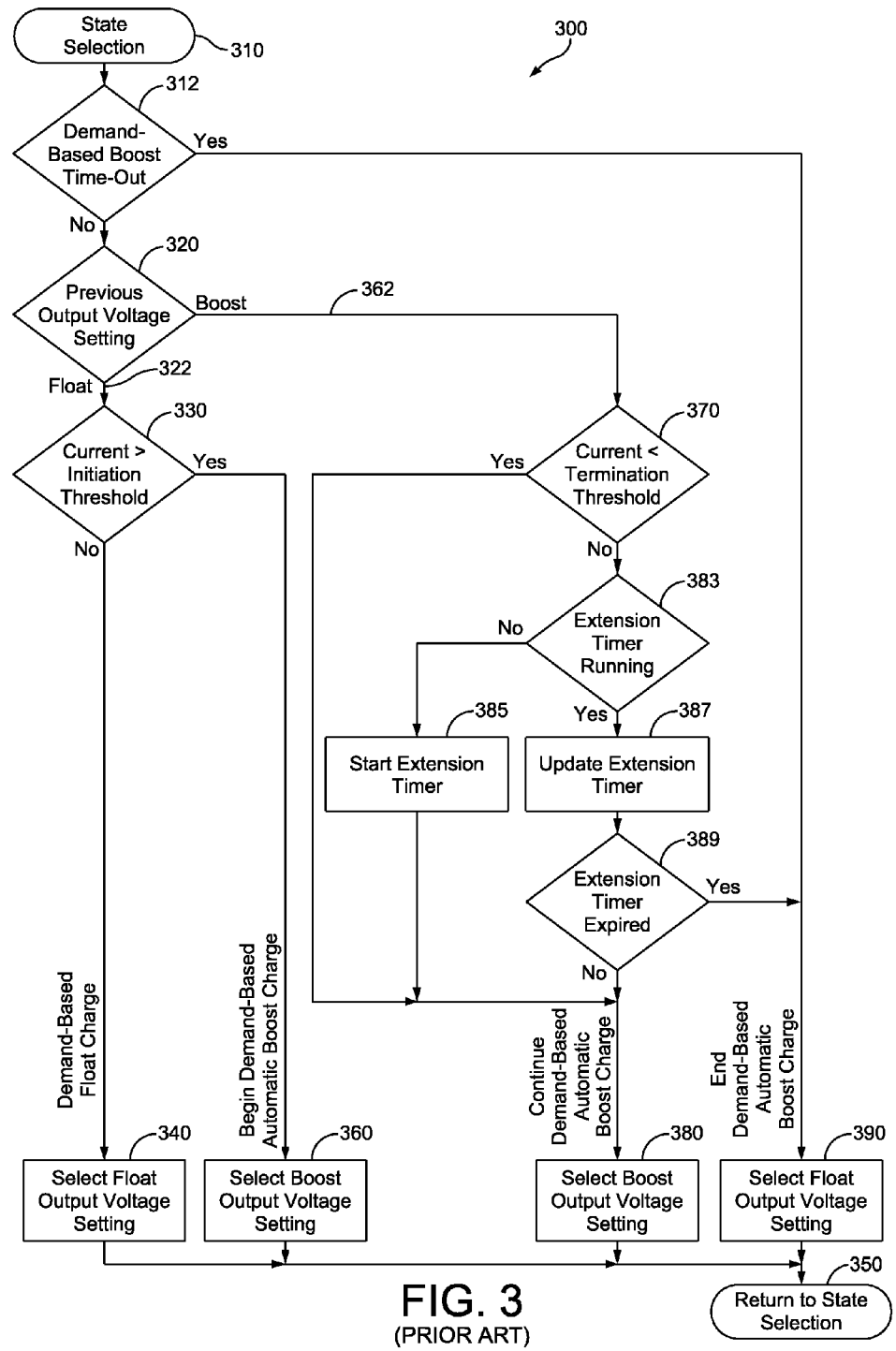
FIG. 3 (PRIOR ART) illustrates a flowchart diagram of a fixed extension demand-based automatic boost charge for an auto-charge system and method.

Prior art FIG. 3 illustrates a flowchart diagram of fixed extension demand-based automatic boost charge for an auto-charge system and method 300, which begins with state selection 310. At 312 a determination is made as to whether a demand-based boot timer has timed-out. If it has not timed-out, a determination is then made at 320 of a previous output voltage setting for the charger. If the charger is at the float voltage (322), then a determination is made at 330 whether the current being drawn by the battery from the charger is greater than an initiation threshold. If not, the demand-based float charge continues and the float output voltage setting is set or retained at 340 and the process returns at 350 to state selection at 310.

If at 330 a determination is made that the current being drawn by the battery from the charger is greater than an initiation threshold, a demand-based automatic charge cycle begins by setting a boost output voltage at 360. The process then returns at 350 to state selection at 310.

Conversely, if the previous output voltage setting at 320 indicated the charger is outputting a boost voltage (362), a determination is made at 370 as to whether a current termination threshold has been reached. If the current termination threshold has been reached, demand-based automatic boost charging continues with the boost output voltage being selected at 380, and the process returns at 350 to state selection 310.

If at 370 the current has not exceeded the termination threshold a determination is made at 383 whether an extension timer is still running. If it is not, the extension timer is started at 385, demand-based automatic boost charging continues with the boost output voltage being selected at 380, and the process returns at 350 to state selection 310.

If at 383 it is determined that the extension timer is still running, the extension timer reading is updated at 387 and a determination is made at 389 as to whether the extension timer has expired. If the extension timer has not expired, demand-based automatic boost charging continues with the boost output voltage being selected at 380, and the process returns at 350 to state selection 310.

If at 389 it is determined that the extension timer has expired, a float output voltage is set at 390, and the process returns at 350 to state selection at 310.

Conversely if a determination is made at 312 that the demand-based boost time has timed out, a float output voltage is set at 390, and the process returns at 350 to state selection at 310.

In any of the above prior systems and methods, at the reversion from boost voltage setting to float voltage (190, 290, 390), the battery's current draw decreases to a very low level, near zero, and then gradually increases again as the battery enters a final "finishing charge" period in which it reaches full charge and returns to its original state in which it draws a normal float current.

Dynamic Demand-Based Automatic Boost Charging Systems

To charge a battery at maximum speed and with maximum safety in accordance with embodiments of the present systems and methods, battery charger embodiments transition from boost charge voltage to float charge voltage at a correct time. The correct time is the point at which the battery achieves full charge, and before excess overcharge occurs. While, prior art auto boost systems have has been used to estimate the correct boost duration, the correct time of transition from boost to float mode varies from battery to battery for several reasons. For a given battery capacity, charger ampere rating, and boost charging voltage, the correct transition time will vary. For example, transition should occur sooner when charging a battery that is only partially discharged versus one that is fully discharged. Also, transition should occur later when charging a battery that is connected in parallel with a fixed DC load compared to a battery not connected to a fixed DC load. Transition time should vary depending on varying ampere load of a DC load connected in parallel with the battery. Transition time should also vary depending on manufacturing tolerances, the battery's age, number of charge/discharge cycles, maintenance regime and other battery characteristics.

In accordance with various embodiments of the present dynamic boost charging systems and methods, an automatic determination of the correct time to transition from boost to float charging mode is made, regardless of variables affecting the battery. Compared with prior art devices and methods, the benefits of embodiments of the present dynamic boost charging systems and methods include that, for a given charger ampere rating, the battery will be recharged faster and more completely, with reduced risk of overcharge and consequent risk of emission of hydrogen gas, premature loss of electrolyte, and/or shorter battery life.

Embodiments of the present dynamic boost charging systems and methods may monitor the magnitude and timing of the battery charger's output current and use that data to automatically vary the magnitude and timing of the battery charger's voltage setting.

Figure 4:
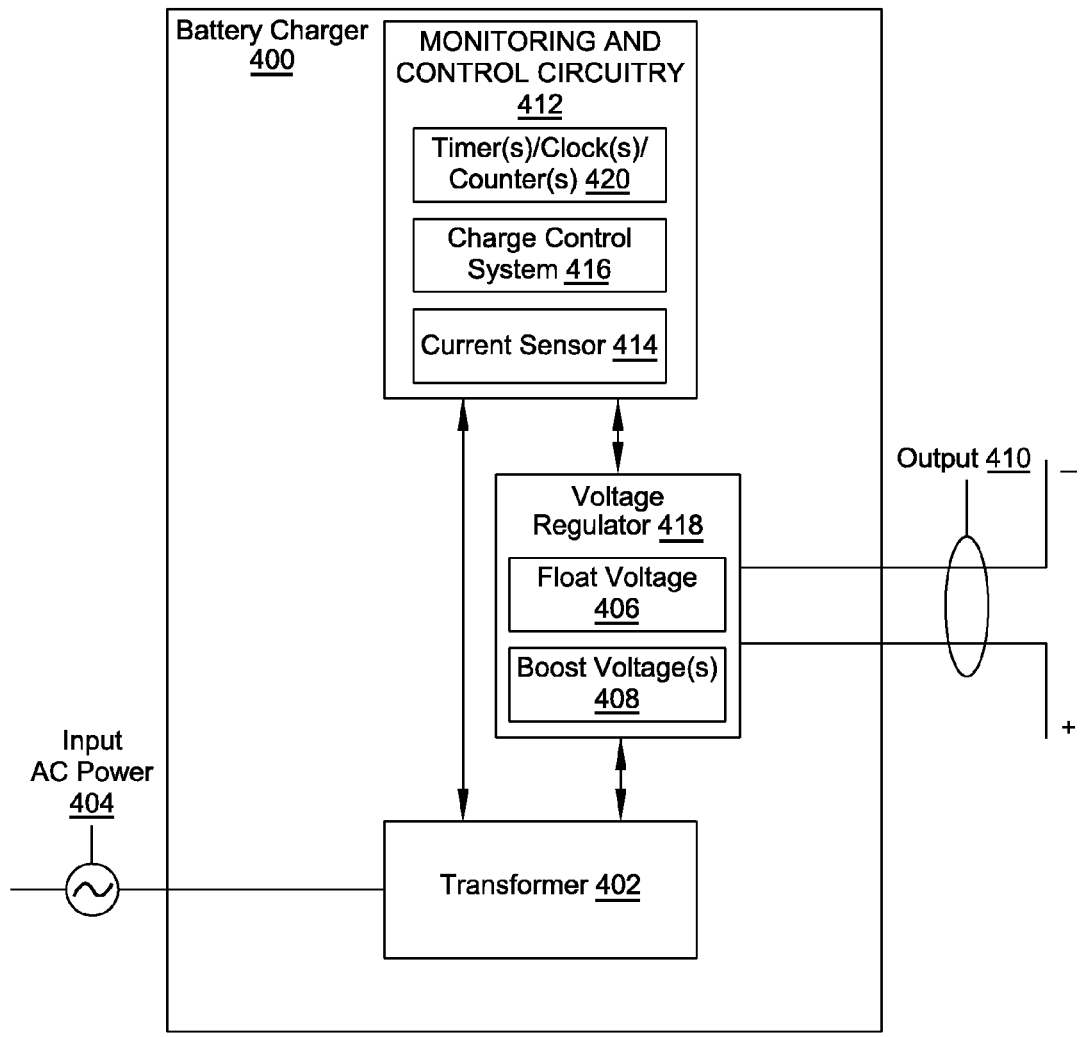
FIG. 4 illustrates a block diagram of a dynamic demand-based automatic boost battery charger, in accordance with at least one embodiment.

FIG. 4 illustrates a block diagram of dynamic demand-based automatic boost battery charger 400, in accordance with at least one embodiment. Battery charger 400 using embodiments of the present dynamic boost charging methods is capable of using two or more preset DC voltage settings such as may be provided by a transformer 402 and related circuitry and components using AC input current 404, float voltage 406 and one or more different boost voltages 408. In accordance with embodiments of the present systems and methods for dynamic boost charging, battery charger 400's preset float and boost voltages (406, 408) are both set correctly, neither too high nor too low, for the battery that will be charged, so that the battery is neither undercharged nor overcharged in float mode (406) and in boost mode(s) (408). Embodiments of the present dynamic boost charging systems and methods provide automatic control of a battery charger's output voltage 410 and employs the battery charger's internal monitoring and control circuitry 412. One component of the battery charger's internal monitoring circuitry is current sensor 414, which is a device that measures the DC output current being delivered by the charger to a load, which is typically a battery. DC current sensor 414 provides DC output current data to charge control system 416, which may include one or more microprocessors, microcontrollers, Application Specific Integrated Circuits (ASICs), and/or the like. This DC output current data is employed for execution of embodiments of the present dynamic boost charging methods. Charge control system 416 may also be interconnected with the battery charger's internal voltage regulation circuitry 418 in order to control transitions of the voltage setting from float to boost and from boost to float. In addition, clock or timer 420 may be included to revise timing of the boost-to-float transition, such as by providing a number of timers.

A first timer may measure how long the charger is delivering output current above a reversion threshold. Since the battery charger "knows" this time period, this data can be used to determine the length of the extended boost time period. A second timer may determine when charger 400 reverts from boost voltage 408 to float voltage 406 at the end of the extended boost time period, which varies dynamically based upon the length of the first time period. In accordance with embodiments of the present systems and methods, battery 400 charger reverts from boost voltage 408 to float voltage 406 so that battery charger 400 is not fixed at boost voltage 408 and so that the battery is not overcharged. In accordance with embodiments of the present systems and methods, the inclusion of a dynamically variable time limit for the boost period accurately terminates the charge cycle, providing a thorough recharge with reduced risk of overcharge.

The battery charger's use of a counting means to measure and store time data, charge data, or both, in accordance with embodiments of the present systems and methods, may extend the time that the charger stays in boost mode, before reverting back to float mode. Thus In accordance with embodiments of the present systems and methods, timing means 420 interacts with demand-based control means 416 and with the battery charger's internal voltage regulation circuitry 418 in order to make transitions in both directions between preset float voltage 406 and preset boost voltage(s) 408.

Dynamic Demand-Based Automatic Boost Charging Methods

Figure 5A:
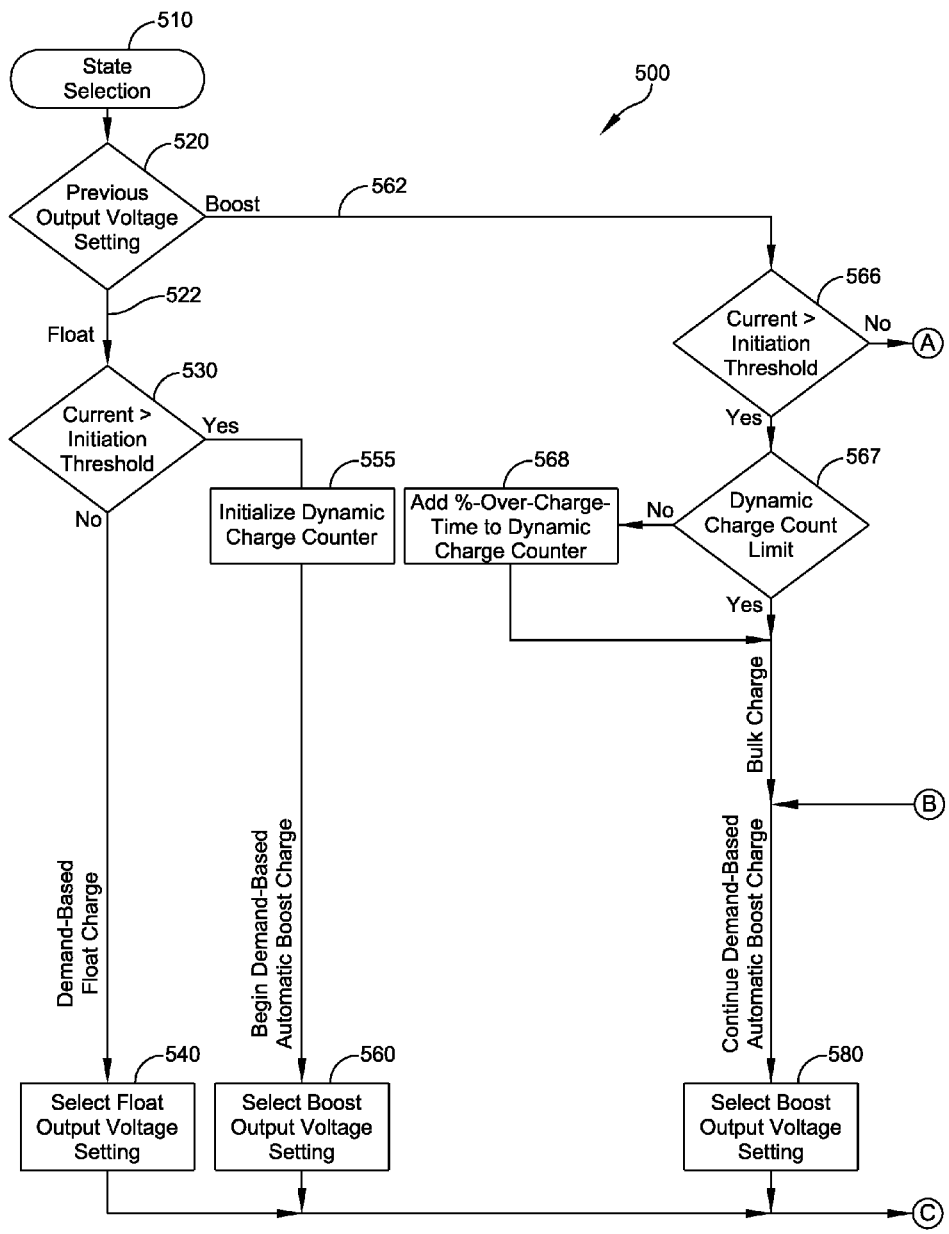
FIGS. 5A and 5B illustrate an exemplary flowchart diagram of a dynamic demand-based automatic boost charge for an auto-charge system and method, according to at least one embodiment.
Figure 5B:
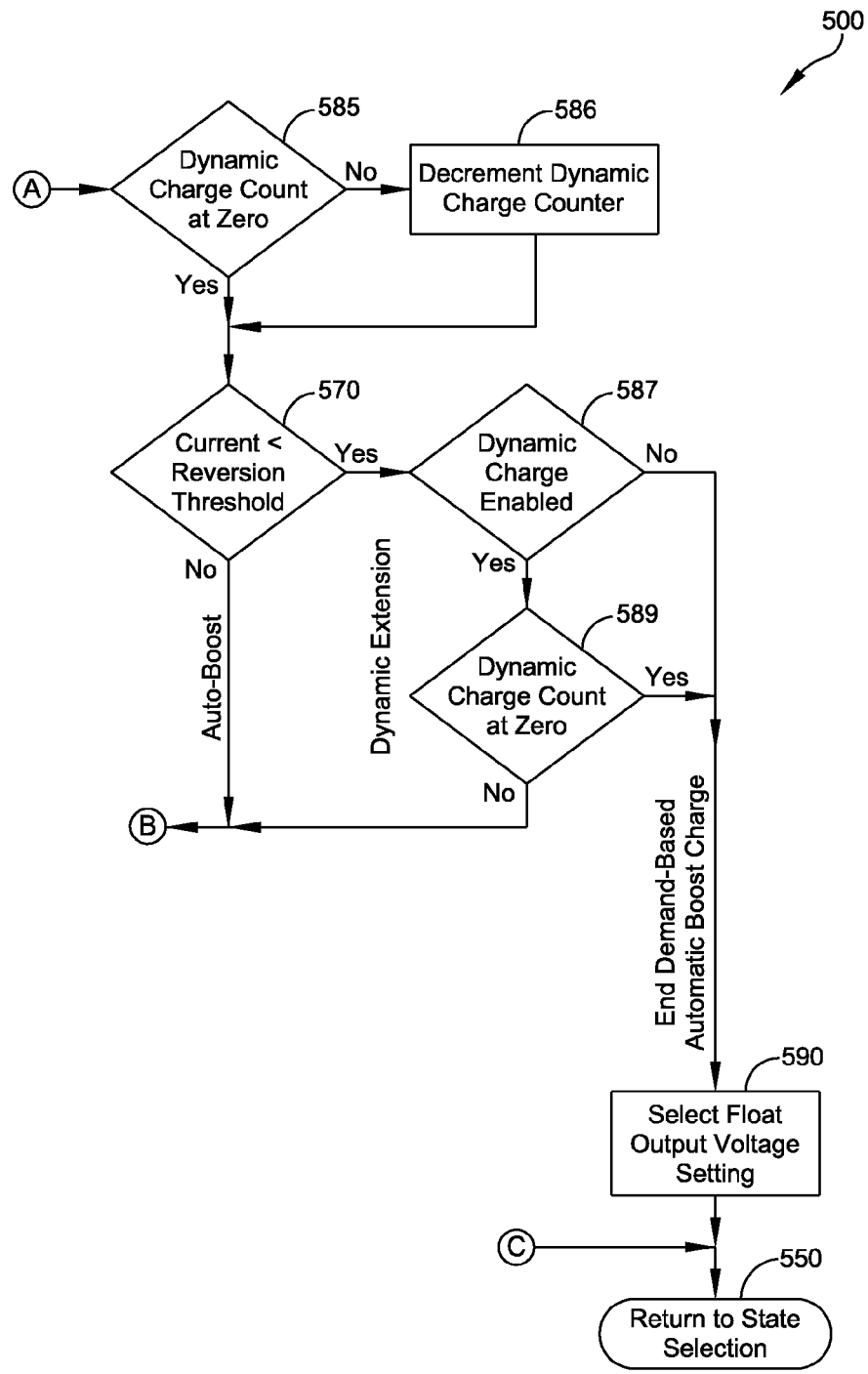

FIGS. 5A and 5B, together, illustrate an exemplary flowchart diagram of dynamic demand-based automatic boost charge for an auto-charge system and method 500, according to at least one embodiment. Beginning in FIG. 5A at state selection 510, a determination is made at 520 of a previous output voltage setting for the charger. If it is determined that the previous output voltage setting is at a float voltage (522), then a determination is made at 530 whether the current being drawn by the battery from the charger is greater than an initiation threshold. If not, the demand-based float charge continues and the float output voltage setting is set or retained at 540 and the process returns at 550 to state selection at 510.

If at 530 a determination is made that the current being drawn by the battery from the charger exceeds an initiation threshold, a dynamic charge counter is initiated at 555 and a demand-based automatic charge cycle begins, with a boost output voltage being set at 560. The process then returns at 550 to state selection at 510.

Thus, if at 520 the previous output voltage setting is at a boost voltage (562), then a determination is made at 566 whether a current initiation threshold has been reached. If it has, a determination is made at 567 whether a dynamic charge count limit has been reached. If it has not, then at 568 a percent over-charge-time is added to the dynamic charge counter, a bulk charge is initiated with a demand based automatic charge cycle. As a result, a boost output voltage setting is selected/retained at 580. The process then returns at 550 to state selection at 510.

Conversely, if a determination is made at 567 that the dynamic charge count limit has been reached, then the bulk charge is initiated with a demand based automatic charge cycle, without adding over-charge-time to the dynamic charge counter. And again, a boost output voltage setting is selected/retained at 580 and the process returns at 550 to state selection at 510.

Again, at 566, a determination is made whether the current is greater than the initiation threshold. Turning to FIG. 5B, if the current is less than the initiation threshold, a determination is made at 585 whether the dynamic charge counter has reached zero. If it has, a determination is made at 570 as to whether a current flowing is less than a reversion threshold. Similarly, if it is determined at 585 that the dynamic charge counter has not reached zero, the dynamic charge counter is decremented at 586, and the determination is made at 570 as to whether a current flowing is less than a reversion threshold. If the current is greater than the reversion threshold, an auto-boost is initiated, with a demand based automatic charge cycle. As a result, a boost output voltage setting is selected/retained at 580. The process then returns at 550 to state selection at 510.

Thus, if at 570 it is determined that the current flowing is less than the reversion threshold, a determination is made at 587 whether dynamic charging is enabled. If it is, dynamic charge extension takes place and a determination is made at 589 whether the dynamic charge counter has reached zero. If not, returning to FIG. 5A, auto-boost is initiated, with a demand based automatic charge cycle. As a result, a boost output voltage setting is selected/retained at 580. The process then returns at 550 to state selection at 510.

Returning to FIG. 5B, if at 587 a determination is made that dynamic charging is not enabled, or if it is and at 589 a determination is made that the dynamic charge counter has reached zero, the demand based automatic boost charge cycle ends and a float output voltage is set at 590. The process then returns at 550 to state selection at 510.

In accordance with embodiments of the present systems and methods, such as illustrated in FIGS. 5A and 5B, dynamic demand-based automatic boost charge for auto-charge method 500 may include a discharge and recharge cycle. Therein, at some point, a battery is fully charged and drawing float current from the battery charger (522), which is operating at its float voltage setting. An event occurs (such as starting an engine with an electric starter motor powered by the battery, or powering a continuous DC load) so that the battery is now partially or completely discharged. The battery charger's output current automatically increases, due to the battery's increased charge acceptance (530).

Thus, various embodiments of the present dynamic boost charging systems and methods include a discharge and recharge cycle. For example, the battery may be fully charged and drawing float current from the battery charger, which is producing float voltage (522). An event occurs (such as, for example, starting an engine with an electric starter motor powered by the battery, or powering a continuous DC load) so that the battery becomes partially or completely discharged. The battery charger's output current automatically increases, due to the battery's increased charge acceptance. When the current reaches the boost charge initiation threshold (530), a demand-based recharge cycle begins. During the first part of the demand-based charge cycle, the battery charger operates at its maximum level (i.e., "current limit"). While the battery charger operates in current limit, the battery voltage will typically be at a level below the preset float and boost voltage levels. The battery charger's voltage setting automatically transitions from float voltage to boost voltage because its "demand based" charging method is designed to perform this voltage transition based on the demand for DC output current. Typically a battery charger's voltage setting automatically transitions from float voltage to boost voltage because its "demand based" charging method is designed to perform this voltage transition based on the demand for DC output current.

Differing from the standard methods, in embodiments of the present systems and methods, the battery charger starts an internal timer (555) from the point the demand-based charge cycle starts (560) so that the charger can measure the duration of the high current portion of the charge cycle.

As the battery is being recharged, its voltage will gradually increase to become equal to the preset boost voltage. As the battery is further recharged, the battery charger's output current will gradually decrease from its maximum level until it reaches the initiation threshold or other threshold as may be programmed into the control system (566).

Differing from the standard method, at this point in embodiments of the present systems and methods, the timer that was previously counting up begins counting down (567, 568). Until the counter returns to its starting value (567), the charge control system will keep the battery charger's output voltage at boost voltage, regardless of the output current (580).

In accordance with embodiments of the present systems and methods, time, returned charge, or a combination of both may be used to implement dynamic boost charge extension (587, 589). In some embodiments, the extended boost time increments and decrements are weighted according to the output current (570). This sets the extended boost period according to the returned charge (typically measured by Ampere-hours or Coulombs), rather than according to elapsed time (typically measured by hours, minutes, or seconds). The timer does not necessarily count down at the same rate at which it counts up, allowing the extended boost time to be a function of the time spent in constant current charge. A linear fraction or multiple of the constant current charge may be employed. Applying a lower limit will ensure at least a minimum amount of extended charge always occurs. Applying an upper limit reduces the risk of over-charge when a battery requires an unusually long constant current charge that could occur if there were a large static load in parallel with the battery, if a large battery were used, etc.

Various embodiments employ a linear function of elapsed time in constant current charge (570), with both lower and upper limits for extended boost time (587). This embodiment may be highly effective while allowing the charge control system to be simple and low in cost.

After the extended boost period has timed-out (589), then the battery charger automatically reverts from boost voltage to float voltage (590) when output current is less than the reversion transition setting (570).

At the reversion from boost voltage setting to float voltage (590), the battery's current draw decreases to a very low level, near zero, and then gradually increases again as the battery enters a final "finishing charge" period in which it reaches full charge and returns to its original state in which it draws a normal float current.

Figure 6A:
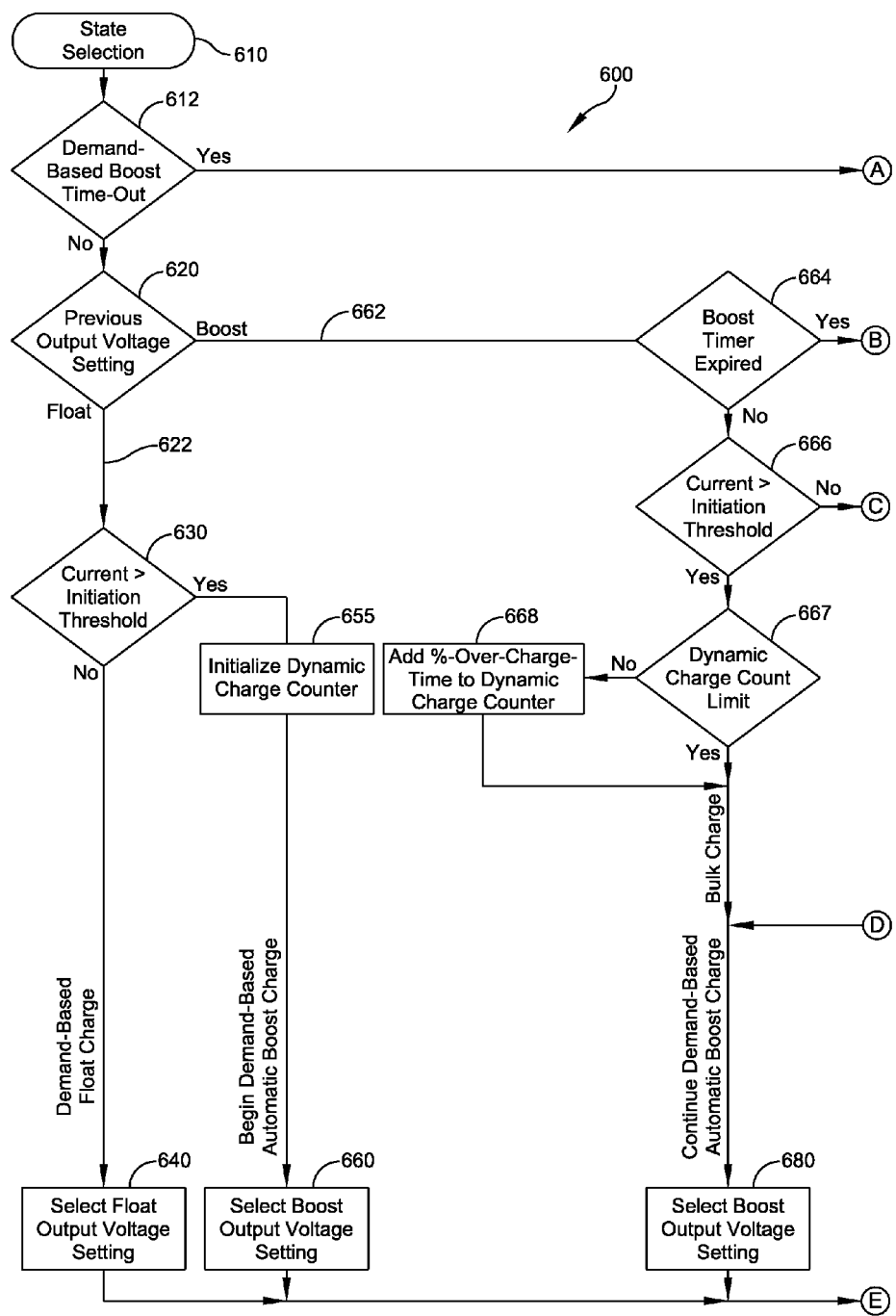
FIGS. 6A and 6B illustrate an exemplary flowchart diagram of a time-limited dynamic demand-based automatic boost charge for an auto-charge system and method, according to at least one embodiment.
Figure 6B:
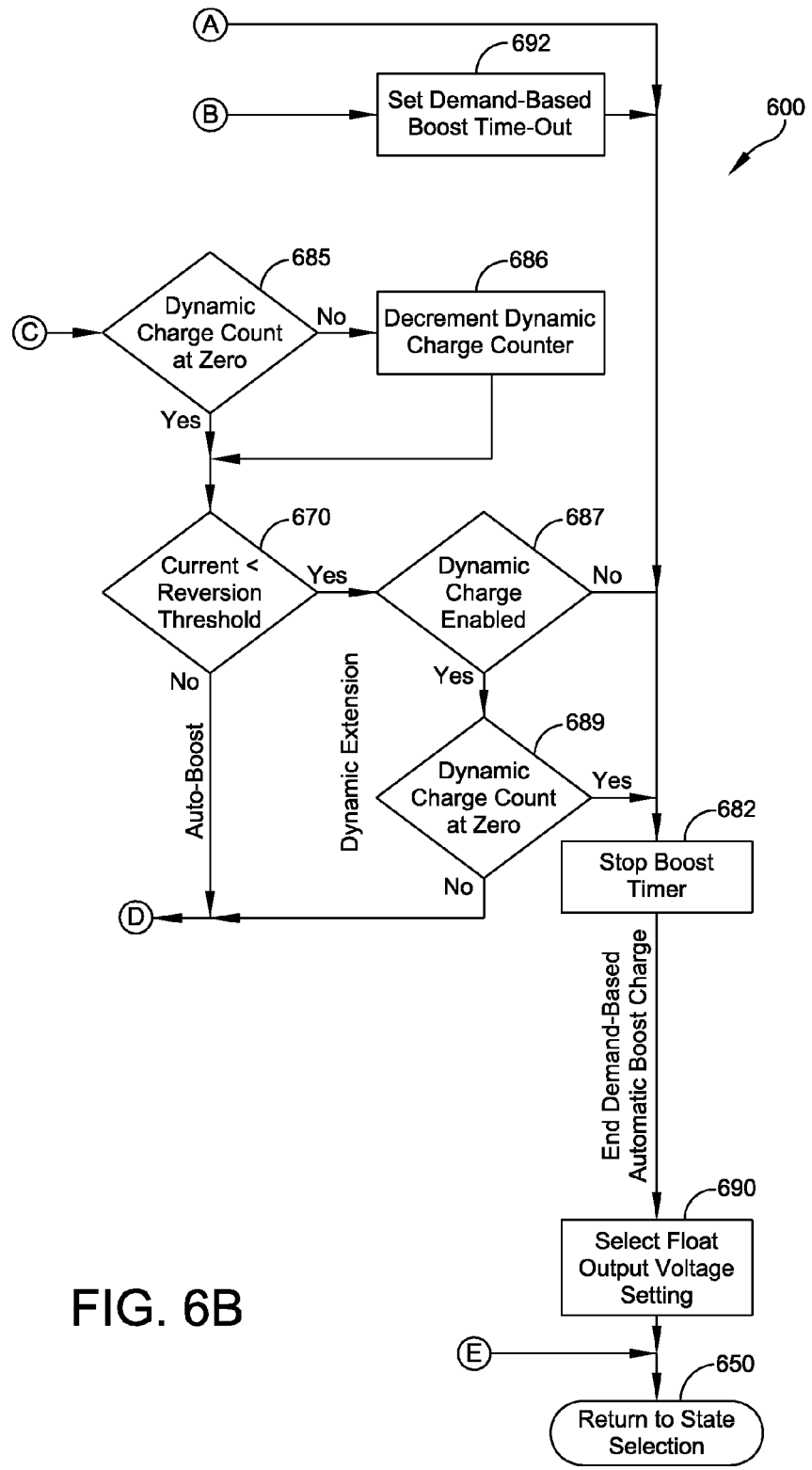

In some embodiments, a time limit may be included for the demand-based charge cycle. If the current remains above the reversion threshold until the time limit expires, the demand-based charge cycle will terminate. This further reduces the risk of over-charging the battery. FIGS. 6A and 6B, together, illustrate an exemplary flowchart diagram of a time-limited dynamic demand-based automatic boost charge for an auto-charge method 600, according to at least one embodiment. Therein, an additional total time limit, as well as a variable extension time (i.e. two separate timer functions) are employed.

Starting in FIG. 6A, at state selection 610, a determination is made at 612 as to whether a demand-based boot timer has timed-out. If it has not, a determination of the previous output voltage setting is made at 620. If it is determined that the previous output voltage setting is at a float voltage (622), then a determination is made at 630 whether the current being drawn by the battery from the charger is greater than an initiation threshold. If not, the demand-based float charge continues and the float output voltage setting is set or retained at 640 and the process returns at 650 to state selection at 610.

A dynamic charge counter is initiated at 655, if a determination is made at 630 that the current being drawn by the battery from the charger is less than an initiation threshold and a boost timer is started at 658, as a demand-based automatic charge cycle begins, with a boost output voltage being set at 660. The process then returns at 650 to state selection at 610.

Conversely, if a determination is made at 620 that the previous output voltage setting is at a boost voltage (662), then at 663 the boost timer reading is updated, and a determination is made at 664 whether the boost timer has expired. If the boost timer has not expired at 664, then a determination is made at 666 whether a current initiation threshold has been reached. If it has, a determination is made at 667 whether a dynamic charge count limit has been reached. If it has not, then at 668 a percent over-charge-time is added to the dynamic charge counter, a bulk charge is initiated with a demand based automatic boost charge. As a result, a boost output voltage setting is selected/retained at 680. The process then returns at 650 to state selection at 610.

However, if a determination is made at 667 that the dynamic charge count limit has been reached, then the bulk charge is initiated with a demand based automatic boost charge, without adding over-charge-time to the dynamic charge counter. And again, a boost output voltage setting is selected/retained at 680 and the process returns at 650 to state selection at 610.

Again, a determination is made at 666 whether the current is greater than the initiation threshold. If it is not, turning to FIG. 6B, a determination is made at 685 whether the dynamic charge counter has reached zero. If it has, a determination is made at 670 as to whether a current flowing is less than a reversion threshold. Similarly, if it is determined at 685 that the dynamic charge counter has not reached zero, the dynamic charge counter is decremented at 686, and the determination is made at 670 as to whether a current flowing is less than a reversion threshold. If the current is greater than the reversion threshold, an auto-boost is initiated, with, returning to FIG. 6A, a demand based automatic charge cycle. As a result, a boost output voltage setting is selected/retained at 680. The process then returns at 650 to state selection at 610.

Returning to FIG. 6B, if at 670 it is determined that the current flowing is less than the reversion threshold, a determination is made at 687 whether dynamic charging is enabled. If it is, dynamic charge extension takes place and a determination is made at 689 whether the dynamic charge counter has reached zero. If not auto-boost is initiated, returning to FIG. 6A, with a demand based automatic charge cycle. As a result, a boost output voltage setting is selected/retained at 680. The process then returns at 650 to state selection at 610.

Returning again to FIG. 6B, if at 687 a determination is made that dynamic charging is not enabled, or if it is and at 689 a determination is made that the dynamic charge counter has reached zero, the boost timer is stopped at 682, the demand based automatic boost charge cycle ends and a float output voltage is set at 690. The process then returns at 650 to state selection at 610.

Returning to 664 and FIG. 6A, if the boost timer has expired, a demand-based boost time-out is set at 692 (see FIG. 6B), the boost timer is stopped at 682, a float output voltage is set at 690, and the process returns at 650 to state selection at 610.

As noted, a time limit may be included for the demand-based charge cycle, such that if the current remains above the reversion threshold until the time limit expires, the demand-based charge cycle will terminate, to reduce the risk of over-charging the battery. Thus, returning to FIG. 6A and 612, if a determination has been made that the demand-based boost has timed out, the boost timer is stopped at 682 (see FIG. 6B), and the demand based automatic charge cycle ends with a float output voltage being set at 690. The process then returns at 650 to state selection at 610.

Hence, in accordance with embodiments of the present systems and methods, in addition to the usual demand-based boost charge criteria (i.e., reversion transition current and time-out), embodiments of the present systems and methods, obtain an initial time or charge measurement, determine an appropriate time or charge to complete the recharge cycle based on that measurement, and maintain boost voltage until that additional time or charge has been provided. Thus, embodiments of the present dynamic boost charging systems and methods provide the time measurement, the calculation, and the execution of an extended boost time period, supplementing typical standard demand-based boost charging methods used in commercial chargers.

Embodiments of the present dynamic boost systems and methods perform a function differently as a result of being adaptive. The amount of time the charger remains in boost mode depends on how long it takes for the battery's current acceptance to start tapering off.

The standard and dynamic charging methods are similar in that both are automatic demand-based methods that effect transitions between preset float and boost voltages, depending on battery charging current. They are different, in addition to other factors, in that embodiments of the present dynamic boost charging methods make a time and/or charge measurement and stays in boost mode for an additional variable time period that is based on the measured boost time and/or charge required for the initial part of the recharge cycle.

By keeping the battery charger in boost mode for a longer period of time, in accordance with various above embodiments of the present systems and methods, a faster recharge is achieved. By using a variable duration for the extended boost period, which is derived from the observed initial boost period, the risk of overcharge is decreased.

The first time interval (555, 585, 570, 580) measures how long the charger is delivering output current above the reversion threshold. Since the battery charger "knows" this time period, this data can be used to determine the length of the extended boost time period. A second time interval (555, 585, 570, 587) determines when charger reverts from boost voltage to float voltage at the end of the extended boost time period, which varies dynamically based upon the length of the first time period. Thereby, battery charger 400 may successfully revert from boost voltage to float voltage so that the battery charger does not remain at a boost voltage and so that the battery is not overcharged. The inclusion of a dynamically variable time limit for the boost period accurately terminates the charge cycle, providing a thorough recharge with reduced risk of over-charge.

An exemplary numerical example of use of embodiments of the present dynamic boost charging systems and methods may employ an initiation threshold current (530, 630) of 10 Amperes, a reversion threshold current (570, 670) of 7.5 Amperes, and a dynamic charge extension (568, 578) of 50% of the elapsed constant current charge time. This numerical example is not to be construed as a description of limitations with regard to voltages, currents, and time periods. The embodiments of the present dynamic boost charging systems and methods may be capable of functioning within wide ranges of voltages, currents, and time periods, limited only by the capabilities of the battery charger that is used to execute the method. A battery charger is attached to a battery and a load (such as a starter motor or continuous DC load). The battery charger is rated at 10 Amperes DC (in current limit) and is connected to a fully-charged battery which is drawing 0.25 Amperes float current. The load operates and the battery is therefore partially discharged. At the start of battery recharge the battery charger's output current increases rapidly to 10 Amperes and its output voltage setting transitions automatically from float to boost. The internal timer starts incrementing (555, 655), to measure the time at high current. After one hour, the battery is partially recharged and the output current falls below the 10 Ampere initiation threshold (566). At this time the internal timer operation changes from increment mode to decrement mode (567). Twelve minutes later, the current has dropped to 7.5 Amperes at which point it would have reverted to float mode if the battery charger were using a prior art charging method. Instead, the internal timer keeps the output voltage at boost voltage for 50% longer (568, 668) than the duration between start of boost mode operation and reduction of battery current acceptance to less than the initiation value of 10 Amperes, making the total boost period 1.5 hours instead of 1.2 hours. At the end of the 1.5-hour time period (589, 689), the battery charger automatically reverts from boost mode to float mode and the battery enters its finishing charge stage. After a few hours, the float current has once again stabilized at 0.25 Amperes.

In accordance with embodiments of the present systems and methods for dynamic boost charging the extended boost interval may be configured to use any numerical multiplier. This may be thought of as a percentage, and may be changed from time to time by reprogramming, without affecting functions of the methods. For example, if an initial value of 50% is used and later found to be at risk for overcharging some types of batteries, this could be reduced to 30% by changing the multiplier accordingly. Alternatively, if a particular application calls for an aggressive recharge time, and the batteries can perform well with aggressive charging, the multiplier could be increased from 50% to 75%. Making a change to these values does not change any functional aspects of the method.

Operation

In operation, in chargers that implement embodiments of the present dynamic boost charging methods, a user may select, by way or example, "Standard demand-based auto equalize", or "Dynamic demand-based auto equalize," settings on a charger by using a keypad located on a front door of the charger, or the like. The user may navigate to an "auto equalize" menu and use keypad up/down arrows to make the selection. After the selection of "Standard" or "Dynamic" is made, battery charging occurs automatically, in accordance with embodiments of the present systems and methods, with no need for manual adjustments or operator intervention.

The battery charger is connected to an adequately functioning rechargeable storage battery of the correct type and polarity to perform battery charging within an acceptable range of temperatures, which are specified by the battery manufacturer. As noted, for temperatures that are more than 5 degrees C. higher than recommended or lower than 25 degrees C., automatic temperature compensation may be used. Automatic temperature compensation is a feature that may be available in chargers employing the present systems and methods for dynamic demand-based charging. Such temperature compensation causes the battery charger's output voltage to be incrementally higher at lower ambient temperatures, and incrementally lower at higher ambient temperatures. The purpose of temperature compensation is to neither undercharge nor overcharge a battery.

Alternative Embodiments

Embodiments of the present dynamic boost charging method may be employed in more-or-less typical microprocessor-controlled battery chargers, by employ appropriate firmware embodying embodiments of the present systems and methods. This could be implemented on different types of microprocessors and microcontrollers, and with different software coding, as long as the method operates in a substantially similar manner. When implemented by firmware, it would be possible to write different firmware to be compatible with different types of microcontrollers into which it is loaded. When implemented by firmware, that implementation could use binary instruction codes or any more abstract programming language, by a micro-program for a programmable state machine, or as a hardware description language for programmable logic circuits. As one of ordinary skill in the art will appreciate, it may be that different instances of firmware use different approaches to how functions are used and combined. Embodiments of the present systems and methods for dynamic boost charging method may be implemented in transformer-type battery chargers, in switchmode battery chargers, in electro-mechanical chargers (such as engine-driven alternators), and any other charging device with controlled output voltage. Embodiments of the present systems and methods for dynamic boost charging method may be implemented in on battery chargers designed to charge batteries (or battery sets, or battery strings, or battery stacks) of different voltage ratings and ampere-hour capacities and different battery chemistries including various types of lead-acid and nickel-based storage batteries. Embodiments of the present systems and methods for dynamic boost charging method may be implemented using a circuit comprised of standard logic elements instead of a program for a microcontroller or microprocessor. Embodiments of the present systems and methods for dynamic boost charging method may be implemented using an integrated circuit implementation of the standard logic elements, such as a field-programmable gate array (FPGA), Application-Specific Integrated Circuit (ASIC), or the like. Embodiments of the present systems and methods for dynamic boost charging method may be implemented using mechanical means, such as a clockwork timer, tally counter (similar to an automotive odometer), a mechanical calculating device (similar to those used in adding machines), etc. Embodiments of the present systems and methods for dynamic boost charging method may be implemented using electro-mechanical means, such as a stepping relay, electro-mechanical tally counter (as used for score counters in electro-mechanical pinball machines), etc.

In accordance with various further embodiments of the present systems and methods, dynamic charge duration may be set according to accumulated charge (Ampere-hours) instead of, or in addition to, the accumulated recharge time (minutes). Time required to safely recharge a battery may be further reduced by monitoring the battery's current acceptance (and/or other additional parameters and conditions) and keeping the charging voltage at the highest level possible throughout the duration of the recharge cycle without overcharging the battery. Some benefit may be derived from using a range of continuously variable charging voltages rather than two discrete voltage levels called float and boost, in accordance with some embodiments of the present systems and methods.

Because embodiments of the present dynamic boost method can measure the approximate state of charge of a battery based on its charge acceptance, embodiments of the present systems and methods may be used to determine battery health, battery maintenance requirements, and to make predictions regarding end of the battery's service life.

Above-discussed embodiments of the present dynamic demand-based boost charging systems and methods are described as using a microprocessor, microcontroller, or the like, in conjunction with software, firmware, or the like, such as for cost and size reduction. However, as noted, alternate implementations, such as, but not limited to mechanical counters, clockwork timers, and combinations of such devices, can implement embodiments of the present dynamic demand-based boost charging systems and methods.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method comprising:
    initializing a dynamic charge counter and setting a boost voltage, if a float charge current is greater than an initiation threshold;
    determining during a boost charge whether a boost current is greater than an initiation threshold;
    determining if a dynamic charge count limit has been reached, if the boost current is not greater than the initiation threshold;
    adding a predetermined percent over charge time to the dynamic charge counter and retaining the boost voltage, if the dynamic charge count limit has not been reached;
    determining if the dynamic charge counter has reached zero;
    decrementing the dynamic charge counter and retaining the boost voltage, if the dynamic charge count has not reached zero;
    determining if dynamic charging is enabled, if a boost charge current is less than a reversion threshold;
    setting a float voltage if dynamic charge is not enabled;
    determining if the dynamic charge count has reached zero, if the dynamic charge is enabled; and
    setting a float voltage if the dynamic charge counter reaches zero.

2. The method of claim 1, wherein the method is implemented automatically by a processor controlled battery charger.

3. The method of claim 1, further comprising terminating the boost voltage if the boost charge current is greater than a reversion threshold for greater than a predetermined time limit.

4. The method of claim 3, wherein the method is implemented automatically by a processor controlled battery charger.

* * * * *